US012738874B2

(12) United States Patent
Kubo

(10) Patent No.: US 12,738,874 B2
(45) Date of Patent: Sep. 15, 2026

(54) AC MOTOR CONTROL DEVICE AND TANGIBLE COMPUTER READABLE STORAGE MEDIUM

(71) Applicant: DENSO CORPORATION, Kariya-city (JP)

(72) Inventor: Yuki Kubo, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 201 days.

(21) Appl. No.: 18/815,604

(22) Filed: Aug. 26, 2024

(65) Prior Publication Data

US 2024/0421738 A1 Dec. 19, 2024

Related U.S. Application Data

(63) Continuation of application No. PCT/JP2023/005548, filed on Feb. 16, 2023.

(30) Foreign Application Priority Data

Feb. 28, 2022 (JP) ................................ 2022-029308

(51) Int. Cl.

| | |
|---|---|
| ***H02P 1/00*** | (2006.01) |
| ***H02P 3/00*** | (2006.01) |
| ***H02P 23/00*** | (2016.01) |
| ***H02P 23/06*** | (2016.01) |
| ***H02P 23/14*** | (2006.01) |
| ***H02P 23/30*** | (2016.01) |
| ***H02P 27/06*** | (2006.01) |

(52) U.S. Cl.
CPC .......... *H02P 23/30* (2016.02); *H02P 23/0022* (2013.01); *H02P 23/0077* (2013.01); *H02P 23/06* (2013.01); *H02P 23/14* (2013.01); *H02P 27/06* (2013.01)

(58) Field of Classification Search
CPC .. H02P 23/20; H02P 23/0022; H02P 23/0077; H02P 23/06
USPC .......................................................... 318/432
See application file for complete search history.

(56) References Cited

U.S. PATENT DOCUMENTS

| | | | | |
|---|---|---|---|---|
| 9,030,136 B2 * | 5/2015 | Sugita | H02P 21/18 | 318/722 |
| 2011/0248663 A1 * | 10/2011 | Yamakawa | B60L 50/13 | 318/805 |
| 2014/0125264 A1 * | 5/2014 | Nakamura | H02P 6/10 | 318/400.23 |

(Continued)

*Primary Examiner* — Erick D Glass
(74) *Attorney, Agent, or Firm* — Nixon & Vanderhye P.C.

(57) ABSTRACT

A limit range setting section sets a primary limit range from a primary lower limit phase to a primary upper limit phase within an interval from a minimum torque phase to a maximum torque phase in a voltage phase-torque map. The limit range setting section calculates a phase obtained by adding a maximum amount of offset error of a rotation angle sensor to a zero phase as a secondary upper limit phase, and calculates a phase obtained by subtracting the maximum amount of offset error from the zero phase as a secondary lower limit phase. The limit range setting section sets a range from the primary lower limit phase to the secondary upper limit phase when a command torque is negative, and a range from the secondary lower limit phase to the primary upper limit phase when the command torque is positive as a secondary limit range.

4 Claims, 10 Drawing Sheets

(56) References Cited

U.S. PATENT DOCUMENTS

| | | | | |
|---|---|---|---|---|
| 2016/0233800 | A1* | 8/2016 | Fukuta | H02P 6/16 |
| 2021/0175827 | A1* | 6/2021 | Ohno | H02P 21/22 |

* cited by examiner

AC MOTOR CONTROL DEVICE AND TANGIBLE COMPUTER READABLE STORAGE MEDIUM

CROSS REFERENCE TO RELATED APPLICATIONS

This application is a continuation application of International Patent Application No. PCT/JP2023/005548 filed on Feb. 16, 2023, which designated the U.S. and based on and claims the benefits of priority of Japanese Patent Application No. 2022-029308 filed on Feb. 28, 2022. The entire disclosure of all of the above applications is incorporated herein by reference.

TECHNICAL FIELD

The present disclosure relates to an AC motor control device and a tangible computer readable storage medium.

BACKGROUND

Conventionally, a control device is known that controls energization of an AC motor based on a rotor rotation angle of the AC motor detected by a rotation angle sensor such as a resolver.

SUMMARY

An object of the present disclosure is to provide an AC motor control device and an tangible computer readable storage medium that suppresses an influence on voltage phase control caused by an offset error of a rotation angle sensor.

An AC motor control device according to the present disclosure includes an inverter, a torque feedback control unit, and a switching command generation unit. The inverter converts DC power into AC power and supplies it to an AC motor.

A torque feedback control unit calculates a voltage phase of an output voltage of an inverter as a manipulated variable for feedback controlling a torque output by an AC motor. A switching command generation unit generates a switching command for driving the inverter based on a voltage phase and a voltage amplitude calculated by the torque feedback control unit.

The torque feedback control unit includes a torque estimation section, a torque control section, a limit range setting section, and a voltage phase limit section.

The torque estimation section calculates an estimated torque based on an electrical angle detected by a rotation angle sensor. The torque control section calculates a pre-limitation voltage phase so that a torque deviation between a command torque and an estimated torque approaches zero.

The limit range setting section sets a voltage phase limit range in a voltage phase-torque map defined according to a system voltage that is a DC voltage input to the inverter and a rotation speed of the AC motor. The voltage phase limit section limits the pre-limitation voltage phase to a voltage phase limit range instructed by the limit range setting section.

The limit range setting section sets a primary limit range from a primary lower limit phase to a primary upper limit phase within an interval from a minimum torque phase to a maximum torque phase in a voltage phase-torque map.

In the AC motor control device of a first aspect, the limit range setting section calculates a phase obtained by adding the maximum amount of offset error of the rotation angle sensor to a "zero phase" which is the phase where the torque crosses zero in the voltage phase-torque map as a secondary upper limit phase smaller than the primary upper limit phase. Further, the limit range setting section calculates a phase obtained by subtracting the maximum offset error amount of the rotation angle sensor from the zero phase as the secondary lower limit phase that is larger than the primary lower limit phase.

The limit range setting section sets a range from the primary lower limit phase to the secondary upper limit phase as a secondary limit range when the command torque is negative, and sets a range from the secondary lower limit phase to the primary upper limit phase as a secondary limit range when the command torque is positive. The voltage phase limit section limits the pre-limitation voltage phase to the secondary limit range.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
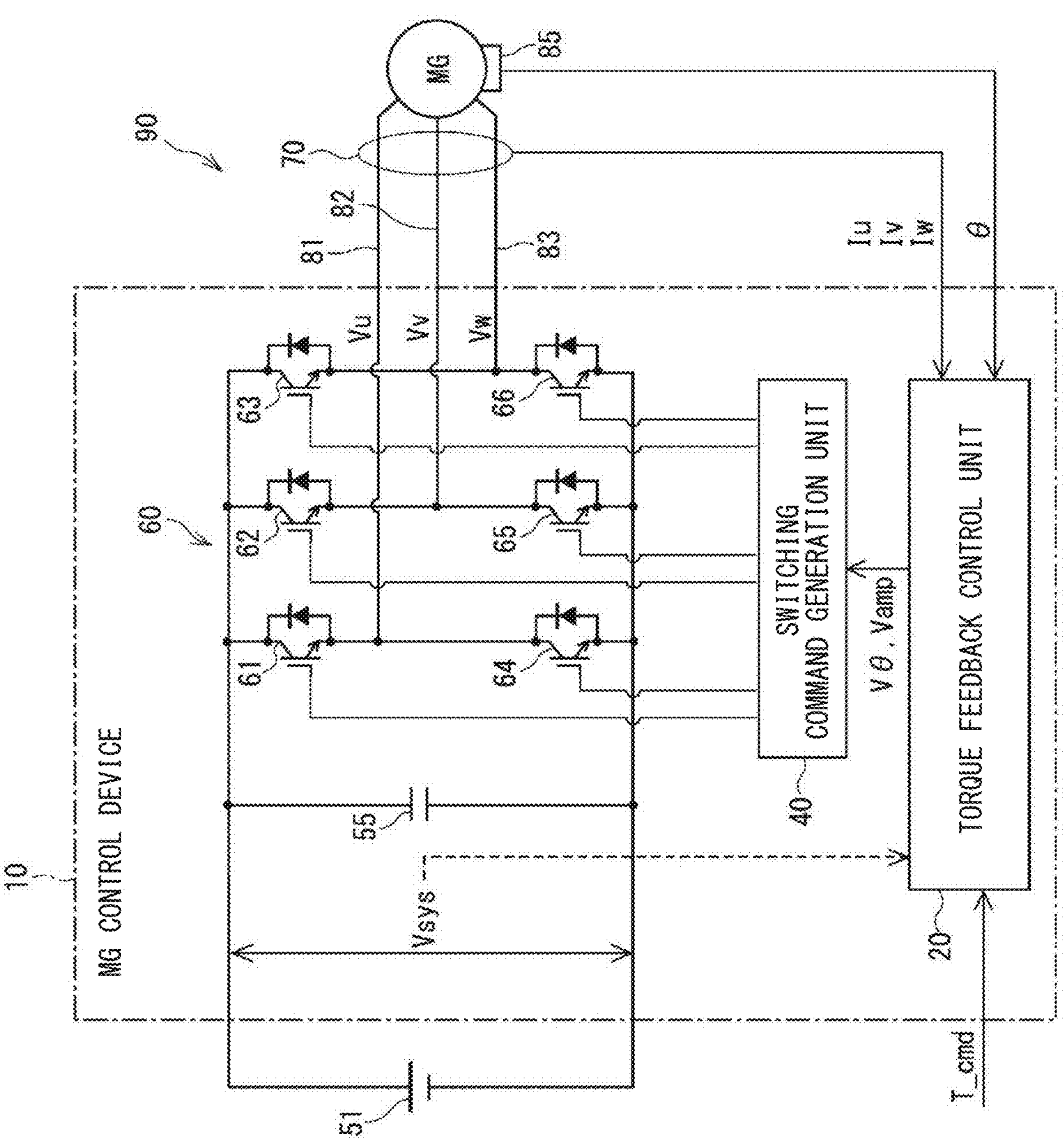
FIG. 1 is a schematic configuration diagram of a MG drive system to which a MG control device of each embodiment is applied.

In an assumable example, a control device is known that controls energization of an AC motor based on a rotor rotation angle of the AC motor detected by a rotation angle sensor such as a resolver. For example, the control device performs a rectangular wave voltage control by controlling a voltage phase using a rectangular wave voltage in a torque feedback control. A torque calculation unit calculates an estimated torque value based on a motor power and an electrical angle detected by a rotation angle sensor, and feeds it back to a command torque.

Generally, a rotation angle sensor such as a resolver has an offset error, and depending on a degree of an offset error, a torque having an opposite sign to the command torque may be generated during voltage phase control. As a result, inconveniences such as generation of driving force contrary to an user's intention, imbalance in power balance, and deterioration of drivability may occur.

An object of the present disclosure is to provide an AC motor control device and an tangible computer readable storage medium that suppresses an influence on voltage phase control caused by an offset error of a rotation angle sensor.

An AC motor control device according to the present disclosure includes an inverter, a torque feedback control unit, and a switching command generation unit. The inverter converts DC power into AC power and supplies it to an AC motor.

A torque feedback control unit calculates a voltage phase of an output voltage of an inverter as a manipulated variable for feedback controlling a torque output by an AC motor. A switching command generation unit generates a switching command for driving the inverter based on a voltage phase and a voltage amplitude calculated by the torque feedback control unit.

The torque feedback control unit includes a torque estimation section, a torque control section, a limit range setting section, and a voltage phase limit section.

The torque estimation section calculates an estimated torque based on an electrical angle detected by a rotation angle sensor. The torque control section calculates a pre-limitation voltage phase so that a torque deviation between a command torque and an estimated torque approaches zero.

The limit range setting section sets a voltage phase limit range in a voltage phase-torque map defined according to a system voltage that is a DC voltage input to the inverter and a rotation speed of the AC motor. The voltage phase limit section limits the pre-limitation voltage phase to a voltage phase limit range instructed by the limit range setting section.

The limit range setting section sets a primary limit range from a primary lower limit phase to a primary upper limit phase within an interval from a minimum torque phase to a maximum torque phase in a voltage phase-torque map.

In the AC motor control device of a first aspect, the limit range setting section calculates a phase obtained by adding the maximum amount of offset error of the rotation angle sensor to a "zero phase" which is the phase where the torque crosses zero in the voltage phase-torque map as a secondary upper limit phase smaller than the primary upper limit phase. Further, the limit range setting section calculates a phase obtained by subtracting the maximum offset error amount of the rotation angle sensor from the zero phase as the secondary lower limit phase that is larger than the primary lower limit phase.

The limit range setting section sets a range from the primary lower limit phase to the secondary upper limit phase as a secondary limit range when the command torque is negative, and sets a range from the secondary lower limit phase to the primary upper limit phase as a secondary limit range when the command torque is positive. The voltage phase limit section limits the pre-limitation voltage phase to the secondary limit range.

In the AC motor control device of a second aspect, a limit range setting section sets a phase obtained by adding a maximum amount of offset error of a rotation angle sensor to a "command phase" which is a phase corresponding to a command torque in the voltage phase-torque map as a secondary upper limit phase. Further, the limit range setting section calculates a phase obtained by subtracting the maximum amount of offset error of the rotation angle sensor from the command phase as a secondary lower limit phase.

The limit range setting section sets a range from a larger phase of the primary lower limit phase or the secondary lower limit phase to a smaller phase of the primary upper limit phase or the secondary upper limit phase as a secondary limit range. The voltage phase limit section limits the pre-limitation voltage phase to the secondary limit range.

The AC motor control device of the first and second aspects limits the voltage phase by setting the secondary limit range associated with the offset error within the primary limit range. Thereby, an influence on voltage phase control caused by the offset error of the rotation angle sensor can be suppressed as much as possible.

Furthermore, in the AC motor control device of the first aspect, the secondary limit range is limited to two patterns depending on the sign of the command torque, so that the calculation load can be reduced. In the AC motor control device of the second aspect, since the limit range of the voltage phase is set based on the command phase, the ability of torque feedback control to follow sudden changes in the command torque is improved.

Further, the present disclosure is also provided as a computer readable storage medium storing a program for operating the torque feedback control unit in the AC motor control device of the first and second aspects. Thereby, the same effects as those of the control device for an AC motor can be achieved.

AC motor control devices and programs according to a plurality of embodiments will be described based on the drawings. The following first and second embodiments are collectively referred to as "the present embodiment". The AC motor control device of the present embodiment is a device that controls energization of a motor generator (hereinafter referred to as "MG") in a system that drives the MG that is a power source of a hybrid vehicle or an electric vehicle. "MG" in each embodiment corresponds to "AC motor", and "MG control device" corresponds to "AC motor control device".

System Configuration

First, with reference to FIG. 1, the overall configuration of an MG drive system 90 to which the MG control device of each embodiment is applied will be described. The MG 80 is, for example, a permanent magnet synchronous three-phase AC motor, and is capable of power operation and regenerative operation. In other words, the MG 80 has both the function of an electric motor that generates the torque that drives the drive wheels of a hybrid vehicle, and the function of a generator that recovers energy by generating electricity from the torque transmitted from the engine and the drive wheels.

Phase currents Iu, Iv, and Iw supplied to each phase winding 81, 82, and 83 are detected by a current sensor 70. Currents in two or one phase of the three phases may be detected, and currents in other phases may be estimated. An electrical angle $\theta$ of the MG 80 is detected by a rotation angle sensor 85. In the present embodiment, a resolver 85 is used as the rotation angle sensor. As will be described later, the present embodiment focuses on offset errors caused by manufacturing variations and the like in the resolver 85. A true electrical angle of the MG 80 is within a range of "±offset errors" with respect to the electrical angle detected by the resolver 85.

The battery 51 is a rechargeable secondary battery such as a lithium ion battery. During the power operation, the inverter 60 converts DC power input from the battery 51 into three-phase AC power and supplies it to the MG 80. During the regenerative operation, the inverter 60 converts the AC power generated by MG 80 into DC power and regenerates it to the battery 51. The DC voltage input to the inverter 60 is referred to as a system voltage Vsys. A boost converter may be provided between the battery 51 and the inverter 60, and a system voltage Vsys obtained by boosting the voltage of the battery 51 may be input to the inverter 60 during the power operation.

A MG control device 10 includes a torque feedback control unit 20, a switching command generation unit 40, and an inverter 60. In the inverter 60, six switching elements 61 to 66 on the upper and lower arms are bridge-connected. Specifically, the switching elements 61, 62 and 63 are upper-arm switching elements of the U-phase, V-phase and W-phase of the first inverter 60, respectively. The switching elements 64, 65 and 66 are lower-arm switching elements of the U-phase, V-phase and W-phase of the first inverter 60, respectively. Each of the switching elements 61 to 66 is formed of, for example, an IGBT. A freewheeling diode that allows a current flowing from a low potential side to a high potential side is connected in parallel to each switching element.

The inverter 60 converts DC power into three-phase AC power by operating the switching elements 61 to 66 according to the switching command generated by the switching command generation unit 40, and applies phase voltages Vu, Vv, and Vw to each phase winding 81, 82, and 83 of the MG 80. A smoothing capacitor 55 smoothes the system voltage Vsys input to the inverter 60.

The torque feedback control unit 20 is constituted by a microcomputer, etc., and internally includes a CPU (not shown), a ROM, a RAM, an I/O, a bus line connecting these components, and the like. The microcomputer executes software processing by executing a program stored in advance by the CPU, and control by hardware processing by a dedicated electronic circuit.

The torque feedback control unit 20 acquires phase currents Iu, Iv, and Iw, an electrical angle θ, and a system voltage Vsys. Further, a command torque T_cmd is commanded to the torque feedback control unit 20 from the higher-level vehicle control circuit. Based on these information, the torque feedback control unit 20 calculates the voltage phase Vθ and the voltage amplitude Vamp so that the MG 80 outputs the desired power torque or regeneration torque, and outputs the voltage phase Vθ and the voltage amplitude Vamp to the switching command generation unit 40.

Specifically, the torque feedback control unit 20 calculates the voltage phase Vθ of the output voltage of the inverter 60 as a manipulated variable for feedback controlling the torque output by the MG 80 in a rectangular wave control mode. The switching command generation unit 40 generates a switching command for driving the inverter 60 based on the voltage phase Vθ and voltage amplitude Vamp calculated by the torque feedback control unit 20.

Although not shown, the MG control device 10 includes, in addition to the torque feedback control unit 20, the function of a current feedback control section that supports sine wave PWM control and overmodulation PWM control mode. The MG control device 10 may select feedback control depending on the operating state of the MG 80 and the like. Details of each control mode are disclosed in Japanese Patent Publication No. 2014-96856 and the like, so a description thereof will be omitted.

Configuration of MG Control Device

Figure 2:
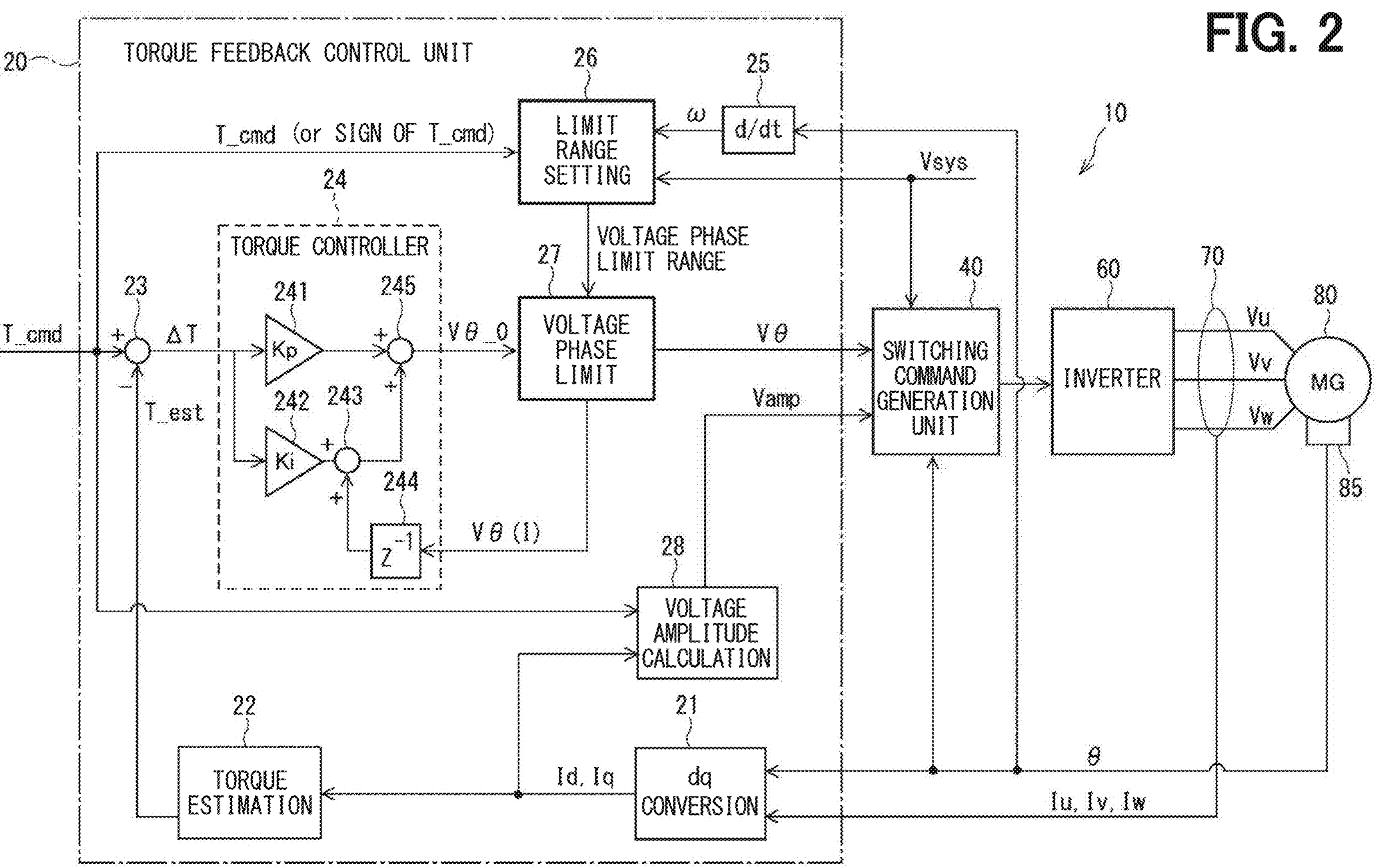
FIG. 2 is a control block diagram of the MG control device of each embodiment.

The configuration of the MG control device 10 will be described with reference to FIG. 2. The torque feedback control unit 20 includes a dq conversion section 21, a torque estimation section 22, a torque deviation calculator 23, a torque controller 24, a differentiator 25, a limit range setting section 26, a voltage phase limit section 27, a voltage amplitude calculation section 29, etc.

The dq conversion section 21 converts the phase currents Iu, Iv, and Iw flowing through the MG 80 into dq-axis currents Id and Iq based on the electrical angle θ detected by the resolver 85. For example, the dq conversion section 21 may be configured with a Fourier filter that calculates a moving average of phase currents for one electrical cycle.

The torque estimation section 22 calculates an estimated torque value T_est of the MG 80 based on the dq-axis currents Id and Iq converted by the dq conversion section 21. Specifically, the torque estimation section 22 calculates the estimated torque T_est based on an equation (1) using the number p of pole pairs of the MG 80, the back electromotive force constant φ, and the dq-axis inductances Ld and Lq.

$$T\_est = p \times \{Iq \times \varphi + (Ld - Lq) \times Id \times Iq\} \tag{1}$$

The torque deviation calculator 23 calculates a torque deviation ΔT between the command torque T_cmd and the estimated torque T_est. The torque controller 24 calculates a pre-limitation voltage phase Vθ_0 by PI calculation so that the torque deviation ΔT approaches zero (0).

A proportional gain multiplier 241 of the torque controller 24 calculates a voltage phase proportional term by multiplying the torque deviation ΔT by a proportional gain. An integral gain multiplier 242 multiplies the torque deviation ΔT by an integral gain to calculate a voltage phase integral term. An integral term adder 243 adds a previous value Vθ(I) of the voltage phase integral term input from a voltage phase limit section 27 via a delay element 244 to an integral term calculated this time. The PI adder 245 calculates the pre-limitation voltage phase Vθ_0 by adding the proportional term of the voltage phase and the integral term after adding the previous value, and outputs it to the voltage phase limit section 27.

The differentiator 25 calculates an angular velocity ω[deg/s] of the MG 80 by differentiating the electrical angle θ[deg] with respect to time. In this specification, the symbol ω is also used for the MG rotational speed [rpm] converted from the angular velocity ω, and it is written as "MG rotational speed ω". The differentiator 25 may be provided outside the torque feedback control unit 20.

The limit range setting section 26 sets a limit range of the voltage phase Vθ in voltage phase control in the voltage phase-torque map defined according to the system voltage Vsys and the MG rotational speed ω. Further, the command torque T_cmd is input to the limit range setting section 26. However, in the first embodiment, only the sign of the command torque T_cmd may be input. Further, the limit range setting section 26 stores therein the maximum amount of offset errors of the resolver 85.

The limit range setting section 26 sets a limit range of the voltage phase Vθ based on information on the command torque T_cmd and the maximum amount of offset errors in addition to the system voltage Vsys and the MG rotational speed ω. The details will be described later. The voltage phase limit section 27 limits the pre-limitation voltage phase Vθ_0 to the voltage phase limit range instructed by the limit range setting section 26 and outputs it to the switching command ("SW command" in the figure) generation unit 40.

The voltage amplitude calculation section 29 calculates the voltage amplitude Vamp based on the command torque T_cmd and the dq-axis currents Id and Iq, and outputs it to the switching command generation unit 40. The switching command generation unit 40 generates a switching command from the voltage phase Vθ and voltage amplitude Vamp using the system voltage Vsys and the electrical angle θ.

Figure 3:
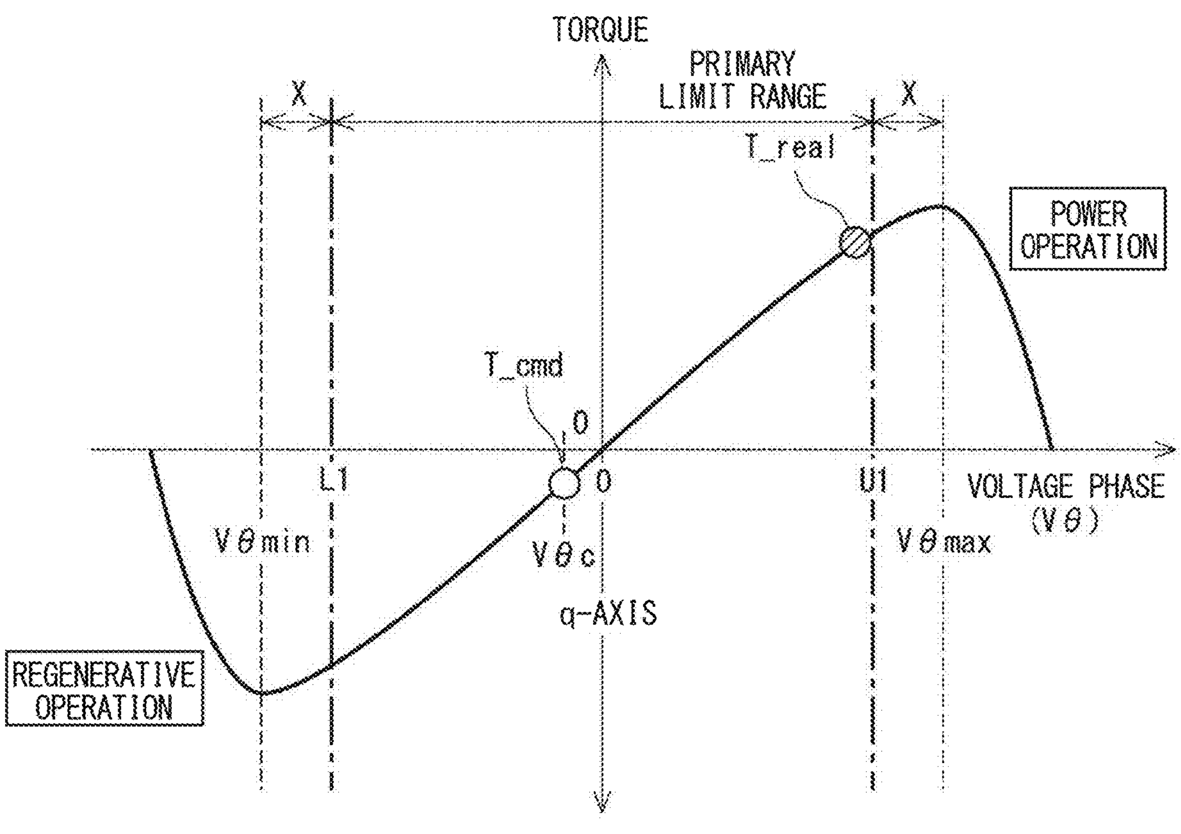
FIG. 3 is a voltage phase-torque map showing a primary limit range.

Next, the setting of the voltage phase limit range by the limit range setting section 26 will be described in detail. FIG. 3 shows a voltage phase-torque map based on an equation (2). This map corresponds to FIG. 6 in Japanese Patent Publication No. 2014-96856. The torque T is expressed as a function of the voltage phase Vθ with the system voltage Vsys and the MG rotational speed w as variables. The number p of pole pairs of the MG 80, the back electromotive force constant φ, and the dq-axis inductances Ld and Lq are stored as constants. The voltage phase Vθ is defined as a counterclockwise angle with the q-axis of the dq-axis voltage vector coordinates as the reference (zero).

$$T = p\phi Vamp/\omega Ld \times \sin V\theta + p(Ld-Lq)Vamp^2/2\omega^2 LdLq \times \sin 2V\theta \quad (2)$$

Torque T is an odd function of voltage phase Vθ, and is point symmetric with respect to an origin. When the voltage phase Vθ is 0, the torque T is 0. A positive torque T means the power operation, and a negative torque T means the regenerative operation. Theoretically, a monotonically increasing range from the minimum torque phase Vθmin during the regeneration operation to the maximum torque phase Vθmax during the power operation is the range in which voltage phase control is possible. When this range is exceeded, the increase/decrease in the voltage phase Vθ is reversed with respect to the change in the torque T, so that the control diverges.

Therefore, in order to avoid control divergence, a limit range of the voltage phase Vθ is set inside the range obtained by subtracting a margin X reflecting detection errors and the like from the theoretical voltage phase controllable range. This limit range according to the conventional technology is defined as a "primary limit range". In this way, the limit range setting section 26 sets the primary limit range from the primary lower limit phase L1 to the primary upper limit phase U1 within the monotonically increasing range from the minimum torque phase Vθmin during the regeneration operation to the maximum torque phase Vθmax during the power operation.

The limit range setting section 26 first draws a voltage phase-torque map according to the system voltage Vsys and the system voltage Vsys, as in the conventional technology, and the limit range setting section 26 sets a primary upper limit phase U1 and a primary lower limit phase L1, which are the upper and lower limits of the primary limit range, in this voltage phase-torque map. In the voltage phase-torque map, a phase corresponding to command torque T_cmd is defined as "command phase Vθc." The command phase Vθc is set within the primary limit range.

By the way, the resolver 85 generally has an offset error, and the command phase Vθc and the phase corresponding to the actual torque T_real deviate from each other due to the offset error. Depending on the degree of the offset error, a torque T_real having an opposite sign to the command torque T_cmd may be generated in voltage phase control.

In the example shown in FIG. 3, the command torque T_cmd is negative (that is, on the regenerative operation side), whereas the actual torque T_real is a relatively large positive (that is, on the power operation side) that is close to the primary upper limit phase U1. As a result, inconveniences such as generation of driving force contrary to an user's intention, imbalance in power balance, and deterioration of drivability may occur.

Therefore, the limit range setting section 26 of the present embodiment sets the secondary limit range associated with the offset error within the primary limit range in order to suppress the influence on voltage phase control caused by the offset error of the resolver 85. Specifically, the limit range setting section 26 uses the maximum amount of offset error of the resolver 85 to set the secondary limit range. The voltage phase limit section 27 limits the voltage phase Vθ to the secondary limit range set by the limit range setting section 26 and outputs it to the switching command generation unit 40.

Here, the maximum amount of offset error of the resolver 85 is determined mostly by variations at the manufacturing stage, and its change over time is also small. Therefore, it is effective for the limit range setting section 26 to use the initial value of the maximum amount of offset error stored at the time of manufacture. However, the limit range setting section 26 may learn and update the maximum amount of offset error each time the MG control device 10 is in operation.

In preparation for setting the secondary limit range, the limit range setting section 26 calculates a secondary upper limit phase and a secondary lower limit phase based on the maximum amount of offset error. Then, the limit range setting section 26 acquires the information on the command torque T_cmd, and sets a secondary limit range by combining four of the primary upper limit phase, primary lower limit phase, secondary upper limit phase, and secondary lower limit phase, depending on the case. The secondary upper limit phase and the secondary lower limit phase are not always the upper and lower limits of the secondary limit range. Next, two patterns in which the limit range setting section 26 sets the secondary limit range will be described as a first embodiment and a second embodiment.

First Embodiment

Figure 4A:
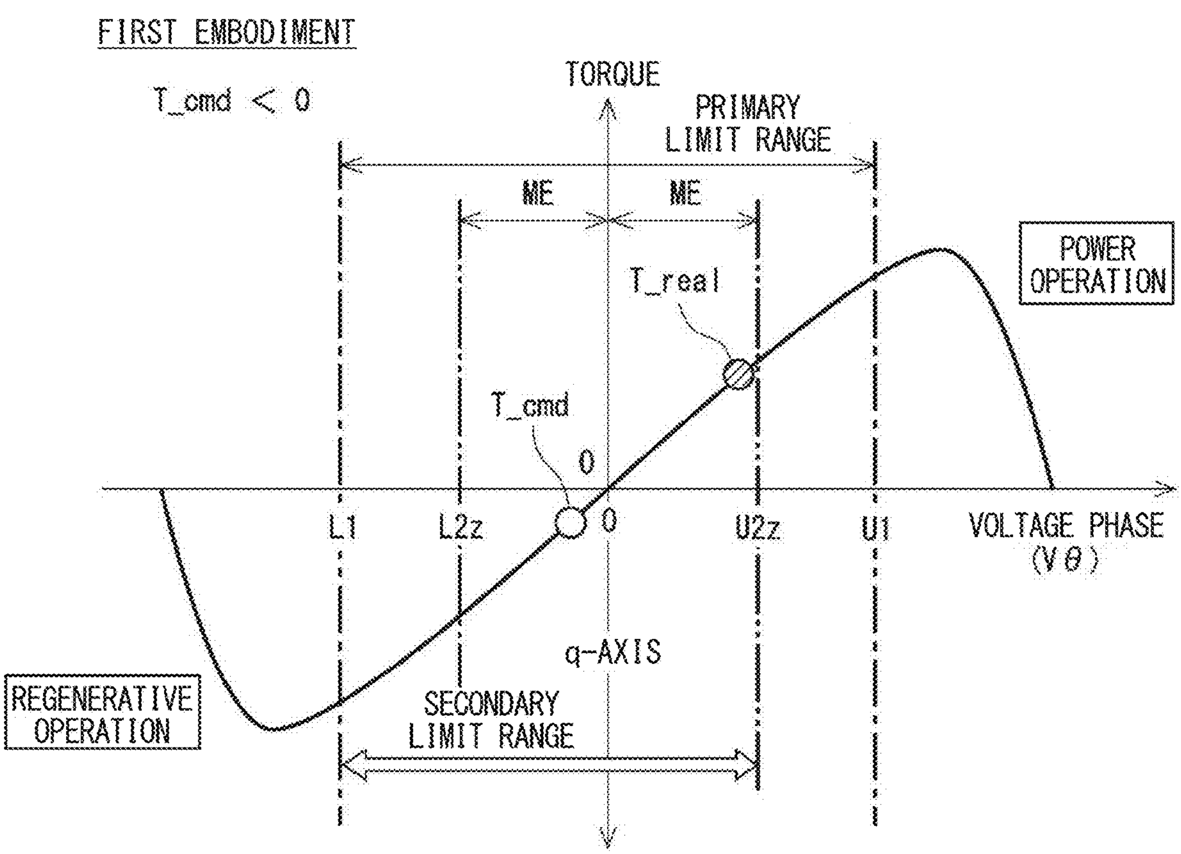
FIG. 4A is a voltage phase-torque map showing a secondary limit range when a command torque is negative in a first embodiment.

The first embodiment will be described with reference to FIGS. 4A, 4B, and 5. A phase where the torque T crosses zero in the voltage phase-torque map is called a zero phase. In the first embodiment, the limit range setting section 26 calculates a secondary upper limit phase H2*z* and a secondary lower limit phase L2*z* using the zero phase as a reference. The "z" at the end of the symbol indicates that the zero phase is the reference.

The limit range setting section 26 calculates a phase obtained by adding a maximum offset error amount ME to the zero phase as the secondary upper limit phase H2*z* smaller than the primary upper limit phase U1. Further, the limit range setting section 26 calculates a phase obtained by subtracting the maximum offset error amount ME from the zero phase as the secondary lower limit phase L2*z* that is larger than the primary lower limit phase L1. The secondary upper limit phase U2*z* and the secondary lower limit phase L2*z* are expressed by equations (3.1) and (3.2). Originally, it is preferable that the maximum offset error amount ME is smaller than the margin X in FIG. 3, but for ease of viewing the diagram, the maximum offset error amount ME is shown larger.

$$U2z = 0 + ME \tag{3.1}$$

$$L2z = 0 - ME \tag{3.2}$$

In the first embodiment, the secondary limit range is set according to the sign of the command torque T_cmd. FIG. 4A shows a case where the command torque T_cmd is negative. In this case, the limit range setting section 26 minimizes the possible range of the actual torque T_real having the opposite sign to the command torque T_cmd by employing the secondary upper limit phase U2$z$ in a positive range of the voltage phase Vθ. On the other hand, in a range where the voltage phase Vθ is negative, there is no need to limit the actual torque T_real having the same sign as the command torque T_cmd, so the primary lower limit phase L1 is adopted. Therefore, the limit range setting section 26 sets the range from the primary lower limit phase L1 to the secondary upper limit phase U2$z$ as the secondary limit range.

Figure 4B:
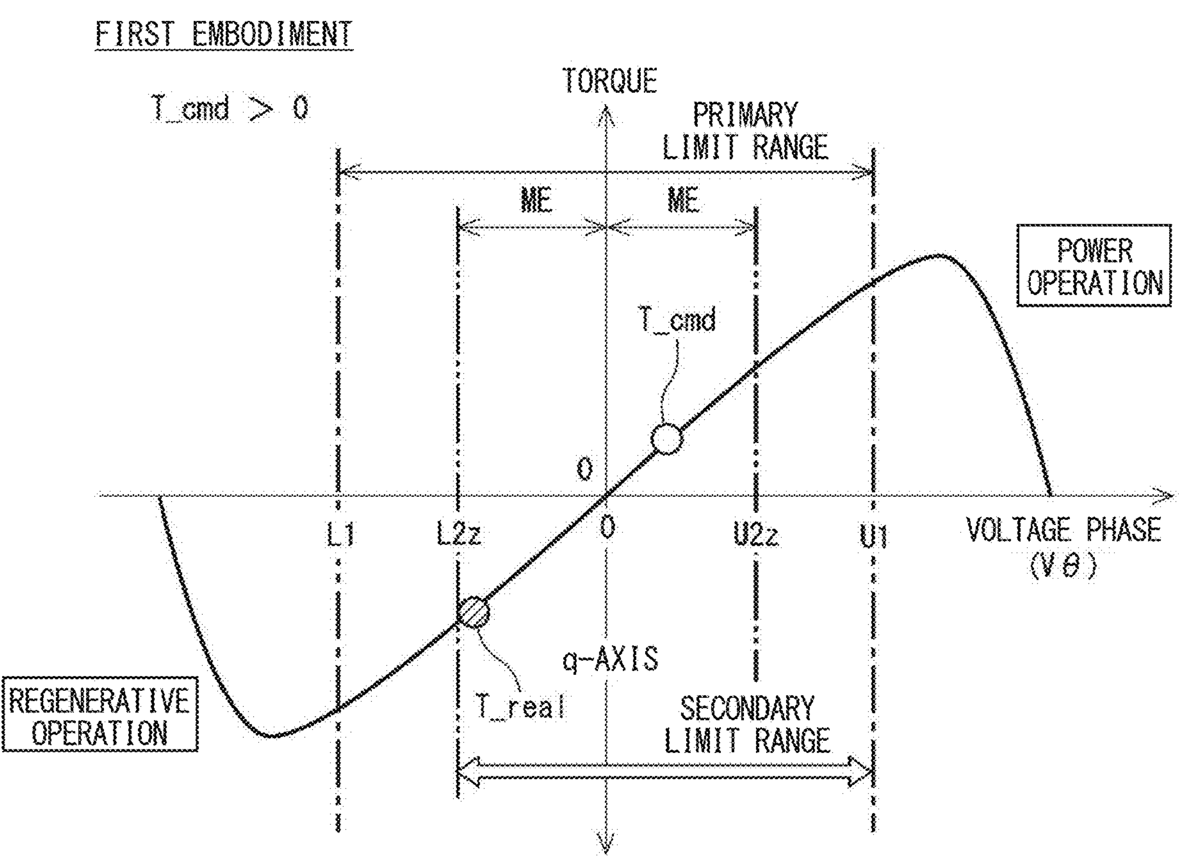
FIG. 4B is a voltage phase-torque map showing the secondary limit range when the command torque is positive in the first embodiment.

FIG. 4B shows a case where the command torque T_cmd is positive. In this case, the limit range setting section 26 adopts the secondary lower limit phase L2$z$ in a range where the voltage phase Vθ is negative. On the other hand, in a range where the voltage phase Vθ is positive, the primary upper limit phase U1 is adopted. Therefore, the limit range setting section 26 sets the range from the secondary lower limit phase L2$z$ to the primary upper limit phase U1 as the secondary limit range.

Figure 5:
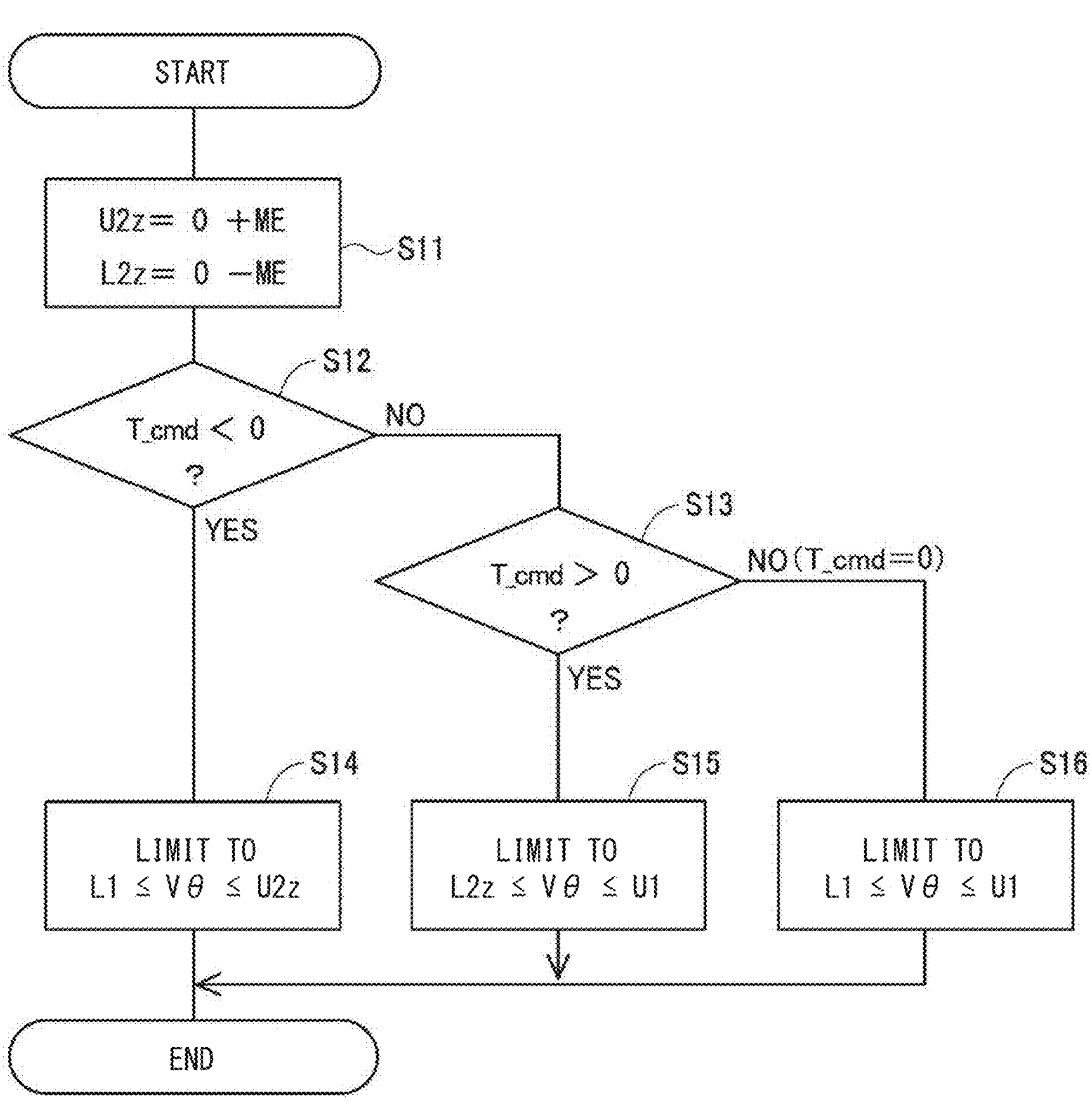
FIG. 5 is a flowchart of the first embodiment.

FIG. 5 shows a flowchart of the first embodiment. The symbol "S" in the flowchart means a step. S11 to S13 show the processing of the limit range setting section 26. S14 to S16 are expressed as processing by the voltage phase limit section 27 to which the limit range setting section 26 has instructed the secondary limit range. This flowchart also shows a program for operating the torque feedback control unit 20 in the MG control device 10 so that predetermined steps are executed.

In S11, the limit range setting section 26 calculates the secondary upper limit phase U2$z$ and the secondary lower limit phase L2$z$ using the zero phase as a reference using equations (3.1) and (3.2). Next, the limit range setting section 26 determines the sign of the command torque T_cmd. When the command torque T_cmd is negative, YES is determined in S12, and the process proceeds to S14. When the command torque T_cmd is positive, NO is determined in S12, YES is determined in S13, and the process proceeds to S15. When the command torque T_cmd is 0, NO is determined in S12 and S13, and the process proceeds to S16. A dead zone may be set so that a predetermined range surrounding 0 is substantially regarded as "T_cmd=0".

The voltage phase limit section 27 limits the voltage phase Vθ to the secondary limit range of "L1≤Vθ≤U2$z$" in S14 and "L2$z$≤Vθ≤U1" in S15. Further, the voltage phase limit section 27 limits the voltage phase Vθ to the primary limit range of "L1≤Vθ≤U1" in S16. When the command torque T_cmd is substantially 0, the MG 80 has stopped driving, so it is hard to imagine a situation where this would cause any inconvenience.

In the first embodiment, the influence of the offset error can be suppressed by minimizing the range of the actual torque T_real having the opposite sign to the command torque T_cmd, which may occur due to the offset error of the resolver 85. Further, in the first embodiment, since the secondary limit range is limited to two patterns depending on the sign of the command torque T_cmd, the calculation load can be reduced.

Second Embodiment

Figure 6:
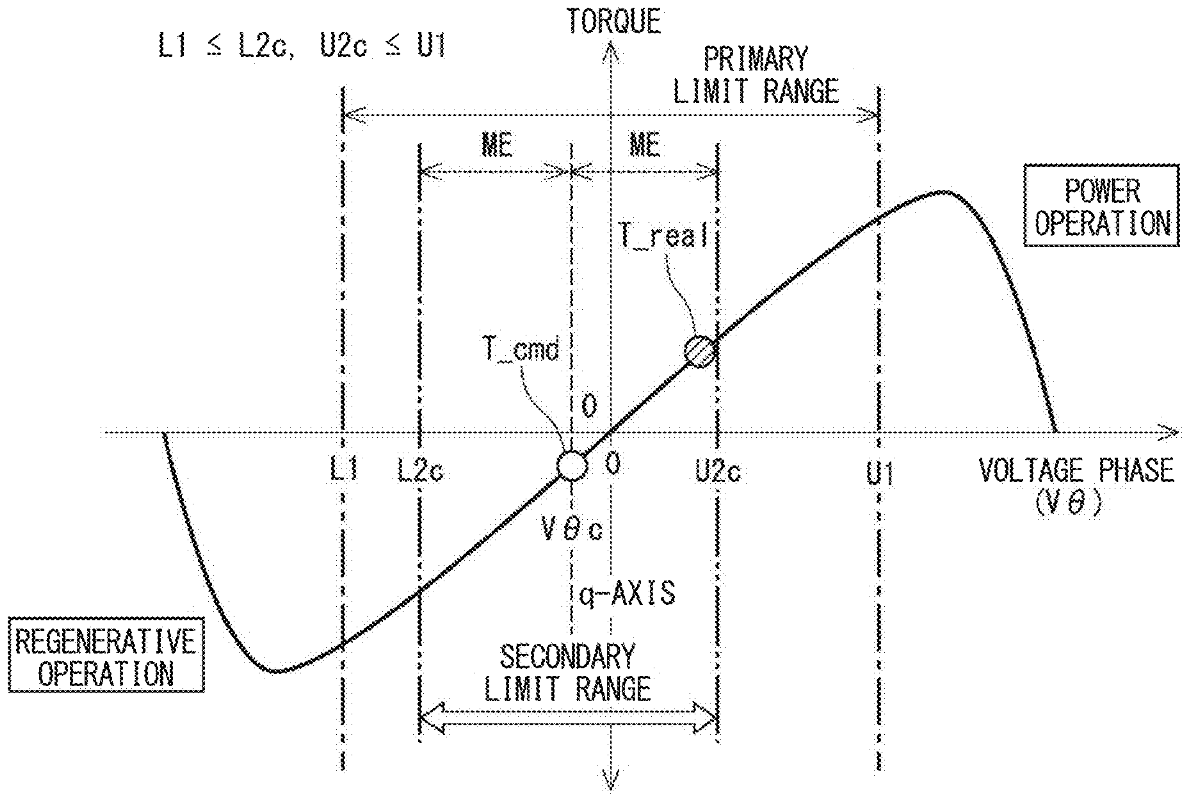
FIG. 6 is a voltage phase-torque map showing the secondary limit range when both a secondary upper limit phase and a secondary lower limit phase are included in the primary limit range in a second embodiment.

The second embodiment will be described with reference to FIGS. 6 to 8. In the second embodiment, the limit range setting section 26 calculates a secondary upper limit phase H2$c$ and a secondary lower limit phase L2$c$ using the command phase Vθc as a reference. The "c" at the end of the symbol indicates that the command phase Vθc is the reference.

The limit range setting section 26 calculates the phase obtained by adding the maximum offset error amount ME to the command phase Vθc as the secondary upper limit phase H2$c$, and calculates the phase obtained by subtracting the maximum offset error amount ME from the command phase Vθc as the secondary lower limit phase L2$c$. The secondary upper limit phase U2$c$ and the secondary lower limit phase L2$c$ are expressed by equations (4.1) and (4.2).

$$U2c = V\theta c + ME \tag{4.1}$$

$$L2c = V\theta c - ME \tag{4.2}$$

In the second embodiment, the secondary limit range is set depending on whether the secondary upper limit phase U2$c$ or the secondary lower limit phase L2$c$ is included in the primary limit range. FIG. 6 shows a case where both the secondary upper limit phase U2$c$ and the secondary lower limit phase L2$c$ are included in the primary limit range. The secondary lower limit phase L2$c$ is greater than or equal to the primary lower limit phase L1, and the secondary upper limit phase U2$c$ is less than or equal to the primary upper limit phase U1. In this case, the limit range setting section 26 sets the range from the secondary lower limit phase L2$c$ to the secondary upper limit phase U2$c$ as the secondary limit range.

Figure 7A:
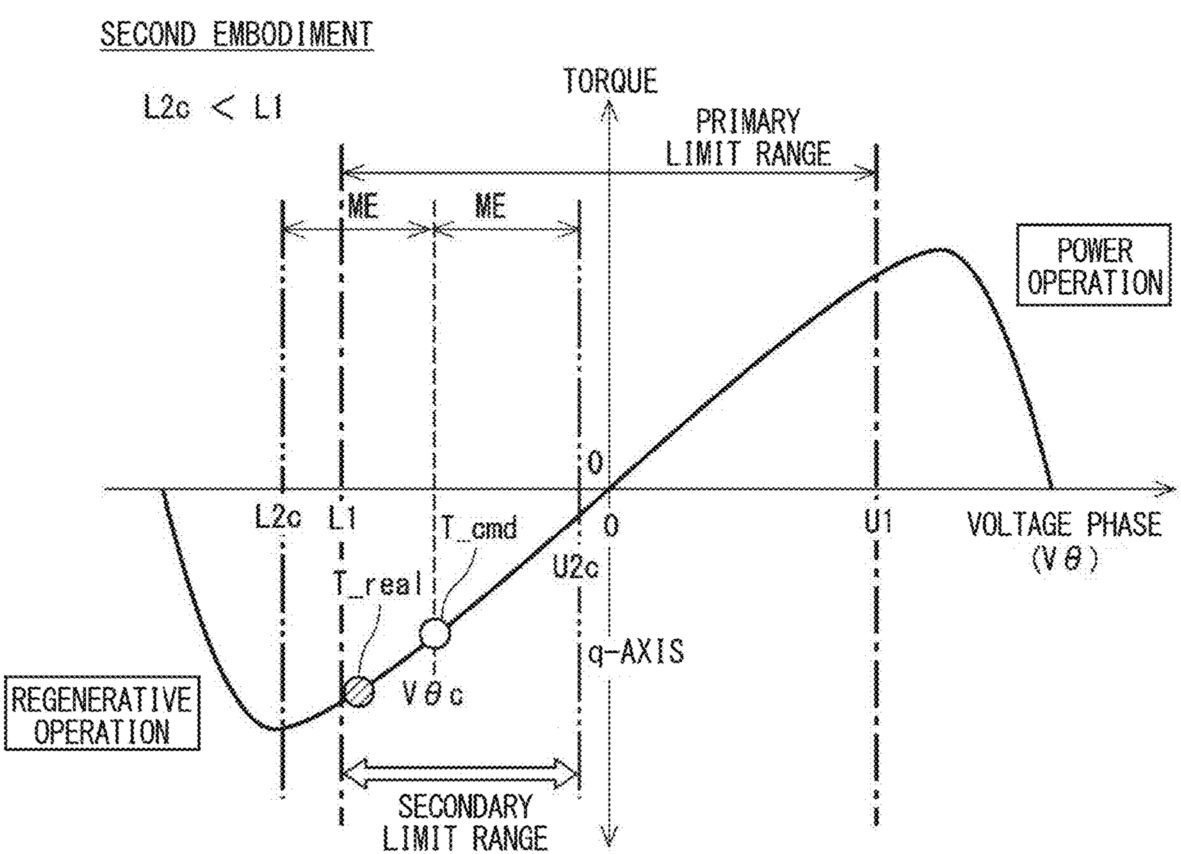
FIG. 7A is a voltage phase-torque map showing the secondary limit range when the secondary lower limit phase deviates from the primary limit range in the second embodiment.

FIG. 7A shows a case where the secondary lower limit phase L2$c$ deviates from the primary limit range. The secondary lower limit phase L2$c$ is smaller than the primary lower limit phase L1. In this case, the limit range setting section 26 sets the range from the primary lower limit phase L1 to the secondary upper limit phase U2$c$ as the secondary limit range.

Figure 7B:
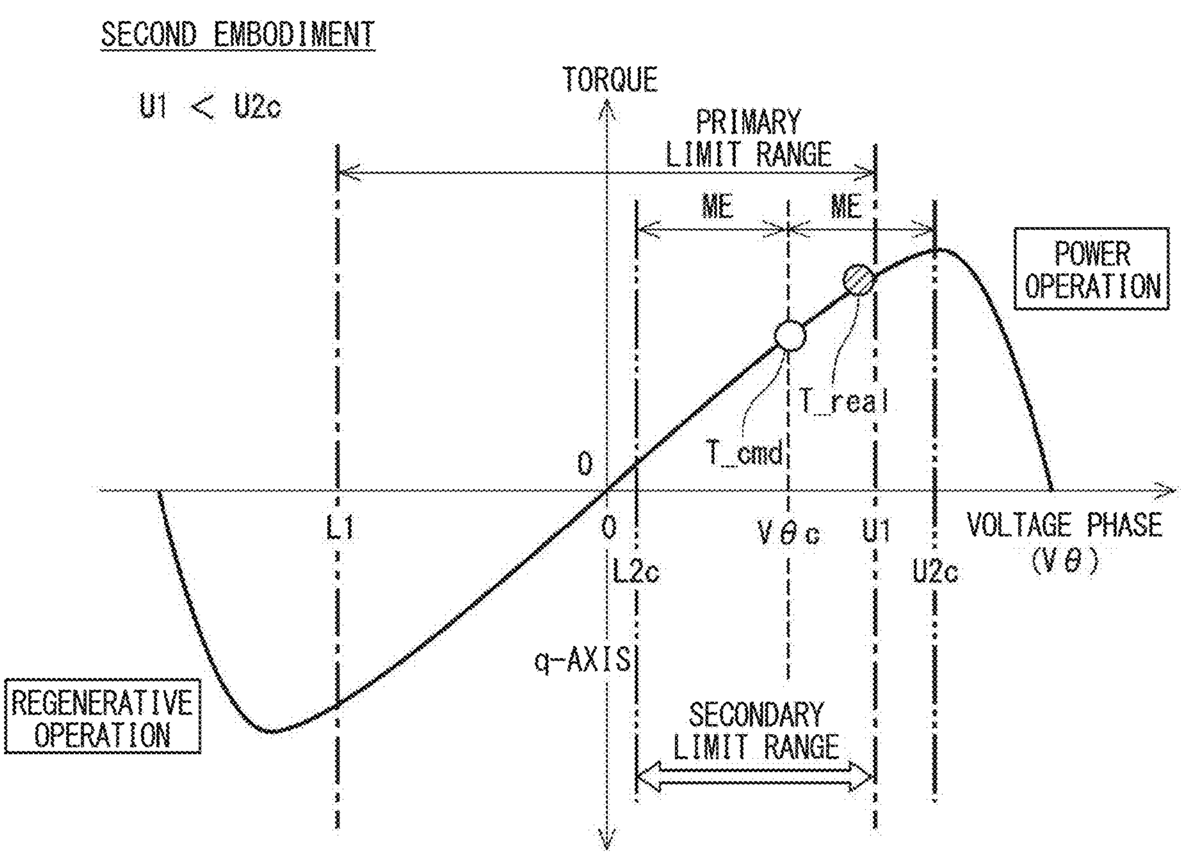
FIG. 7B is a voltage phase-torque map showing the secondary limit range when the secondary upper limit phase deviates from the primary limit range in the second embodiment.

FIG. 7B shows a case where the secondary upper limit phase U2$c$ deviates from the primary limit range. The secondary upper limit phase U2$c$ is larger than the primary upper limit phase U1. In this case, the limit range setting section 26 sets the range from the secondary lower limit phase L2$c$ to the primary upper limit phase U1 as the secondary limit range.

In summary, the limit range setting section 26 sets a range from "the larger phase of the primary lower limit phase L1 or the secondary lower limit phase L2$c$" to "the smaller phase of the primary upper limit phase U1 or the secondary upper limit phase U2$c$" as a secondary limit range.

Figure 8:
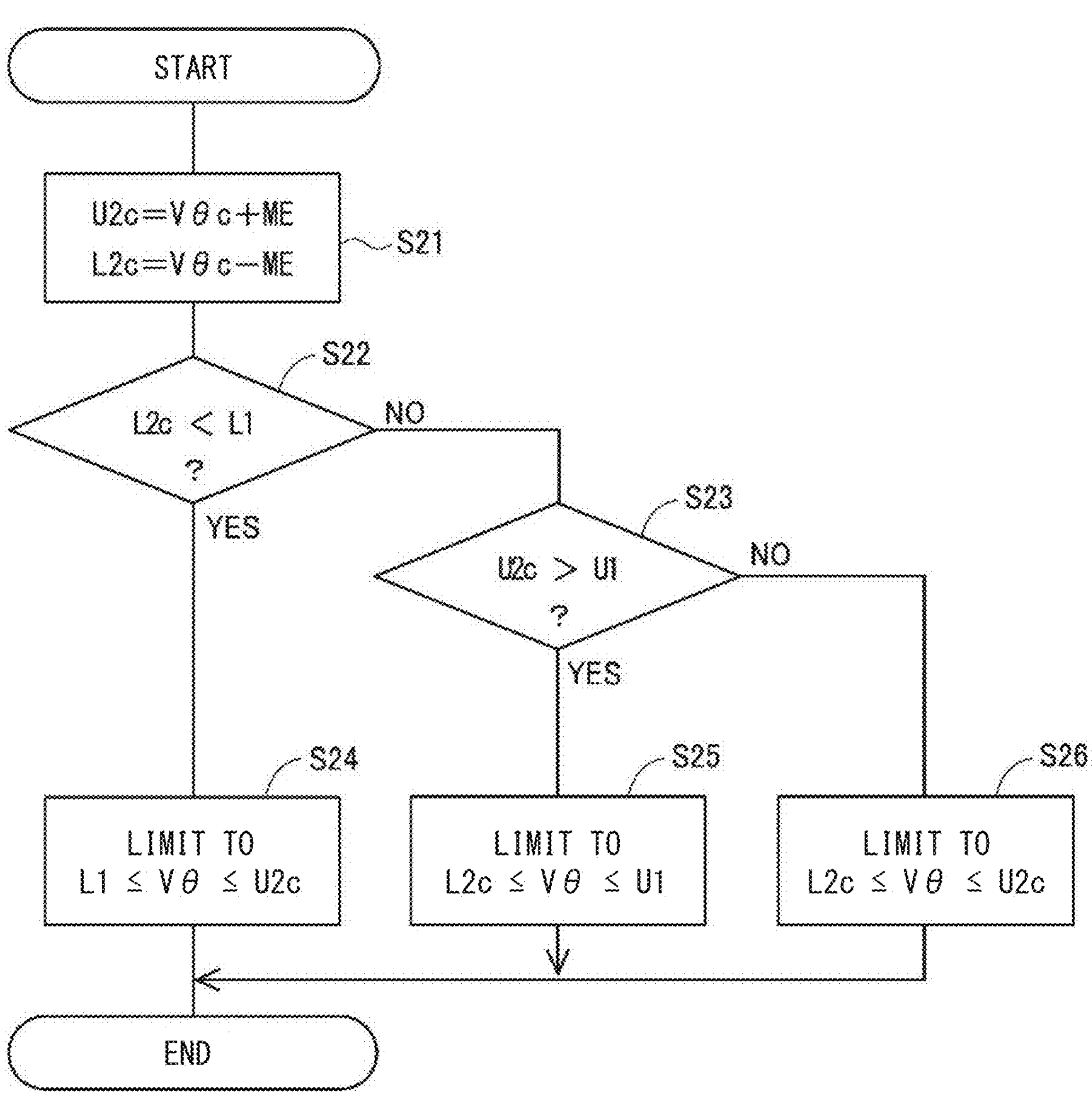
FIG. 8 is a flowchart of the second embodiment.

FIG. 8 shows a flowchart of the second embodiment. S21 to S23 show the processing of the limit range setting section 26. S24 to S26 are expressed as processing by the voltage phase limit section 27 to which the limit range setting section 26 has instructed the secondary limit range. This flowchart also shows a program for operating the torque feedback control unit 20 in the MG control device 10 so that predetermined steps are executed.

In S21, the limit range setting section 26 calculates the secondary upper limit phase U2*c* and the secondary lower limit phase L2*c* using the command phase Vθc as a reference using the equations (4.1) and (4.2). Next, the limit range setting section 26 compares the calculated secondary upper limit phase U2*c* and secondary lower limit phase L2*c* with the primary upper limit phase U1 and the primary lower limit phase L1. When the secondary lower limit phase L2*c* is smaller than the primary lower limit phase L1, YES is determined in S22, and the process proceeds to S24. When the secondary upper limit phase U2*c* is larger than the primary upper limit phase U1, NO is determined in S22, YES is determined in S23, and the process proceeds to S25. When the secondary lower limit phase L2*c* is greater than or equal to the primary lower limit phase L1 and the secondary upper limit phase U2*c* is less than or equal to the primary upper limit phase U1, NO is determined in S22 and S23, and the process proceeds to S26.

The voltage phase limit section 27 limits the voltage phase Vθ to the secondary limit range of "L1≤Vθ≤U2*c*" in S24 and "L2*c*≤VθU1" in S25. Further, the voltage phase limit section 27 limits the voltage phase Vθ to the secondary limit range of "L2*c*≤Vθ≤U2*c*" in S26.

In the second embodiment, the influence of the offset error can be suppressed by minimizing the deviation between the command torque T_cmd and the actual torque T_real that may occur due to the offset error of the resolver 85. Furthermore, in the second embodiment, since the limit range of the voltage phase Vθ is set based on the command phase Vθc, the ability of torque feedback control to follow sudden changes in the command torque T_cmd is improved.

Other Embodiments (a) The "rotation angle sensor" is not limited to the resolver exemplified in the above embodiment, but may be another rotation angle sensor such as a Hall element or a magnetoresistive element.

(b) The "AC motor" to be controlled is not limited to the MG 80 installed in a hybrid vehicle or an electric vehicle, but may be an AC motor for any purpose that performs the power operation and the regenerative operation.

The present disclosure is not limited to the embodiment described above but various modifications may be made within the scope of the present disclosure.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. An AC motor control device, comprising:

a torque feedback control unit configured to calculate a voltage phase of an output voltage of an inverter, which converts DC power into AC power and supply it to an AC motor, as a manipulated variable for feedback controlling a torque output by the AC motor; and a switching command generation unit configured to generate a switching command for driving the inverter based on the voltage phase and a voltage amplitude calculated by the torque feedback control unit;

wherein the torque feedback control unit includes a torque estimation section configured to calculate an estimated torque based on an electrical angle detected by a rotation angle sensor, a torque controller configured to calculate a pre-limitation voltage phase so as to bring a torque deviation between a command torque and the estimated torque close to 0, a limit range setting section configured to set a voltage phase limit range in a voltage phase-torque map defined according to a system voltage that is a DC voltage input to the inverter and a rotation speed of the AC motor, and a voltage phase limit section configured to limit the pre-limitation voltage phase to a voltage phase limit range instructed by the limit range setting section, and the limit range setting section sets a primary limit range from a primary lower limit phase to a primary upper limit phase within an interval from a minimum torque phase to a maximum torque phase in the voltage phase-torque map, calculates a phase obtained by adding a maximum offset error amount of the rotation angle sensor to a zero phase, which is the phase where the torque crosses zero in the voltage phase-torque map, as a secondary upper limit phase smaller than the primary upper limit phase, and calculates a phase obtained by subtracting a maximum offset error amount of the rotation angle sensor from the zero phase as a secondary lower limit phase larger than the primary lower limit phase, and sets a range from the primary lower limit phase to the secondary upper limit phase as a secondary limit range when the command torque is negative, and sets a range from the secondary lower limit phase to the primary upper limit phase as a secondary limit range when the command torque is positive, and the voltage phase limit section limits the pre-limitation voltage phase to the secondary limit range.

2. An AC motor control device, comprising:

a torque feedback control unit configured to calculate a voltage phase of an output voltage of an inverter, which converts DC power into AC power and supply it to an AC motor, as a manipulated variable for feedback controlling a torque output by the AC motor; and a switching command generation unit configured to generate a switching command for driving the inverter based on the voltage phase and a voltage amplitude calculated by the torque feedback control unit;

wherein the torque feedback control unit includes a torque estimation section configured to calculate an estimated torque based on an electrical angle detected by a rotation angle sensor, a torque controller configured to calculate a pre-limitation voltage phase so as to bring a torque deviation between a command torque and the estimated torque close to 0, a limit range setting section configured to set a voltage phase limit range in a voltage phase-torque map defined according to a system voltage that is a DC voltage input to the inverter and a rotation speed of the AC motor, and a voltage phase limit section configured to limit a pre-limitation voltage phase to a voltage phase limit range instructed by the limit range setting section, and the limit range setting section sets a primary limit range from a primary lower limit phase to a primary upper limit phase within an interval from a minimum torque phase to a maximum torque phase in the voltage phase-torque map, sets a phase obtained by adding a maximum offset error of the rotation angle sensor to a command phase, which is a phase corresponding to the command torque in the voltage phase-torque map, as a secondary upper limit phase, and calculates a phase obtained by subtracting a maximum amount of offset error of the rotation angle sensor from the command phase as a secondary lower limit phase, and sets a range from a larger phase of the primary lower limit phase or the secondary lower limit phase to a smaller phase of the primary upper limit phase or the secondary upper limit phase as a secondary limit range, and the voltage phase limit section limits the pre-limitation voltage phase to the secondary limit range.

3. A tangible computer readable storage medium storing a program configured for execution by at least one processor of an AC motor control device, wherein the AC motor control device includes a torque feedback control unit configured to calculate a voltage phase of an output voltage of an inverter, which converts DC power into AC power and supply it to an AC motor, as a manipulated variable for feedback controlling a torque output by the AC motor, and a switching command generation unit configured to generate a switching command for driving the inverter based on the voltage phase and a voltage amplitude calculated by the torque feedback control unit, and the torque feedback control unit includes a function of calculating an estimated torque based on an electrical angle detected by a rotation angle sensor, a function of calculating a pre-limitation voltage phase so as to bring a torque deviation between a command torque and the estimated torque close to 0, a function of setting a voltage phase limit range in a voltage phase-torque map defined according to a system voltage that is a DC voltage input to the inverter and a rotation speed of the AC motor, and a function of limiting the pre-limitation voltage phase to a voltage phase limit range, the program including instructions when executed by the at least one processor to carry out:

setting a primary limit range from a primary lower limit phase to a primary upper limit phase within an interval from a minimum torque phase to a maximum torque phase in the voltage phase-torque map;

calculating a phase obtained by adding a maximum offset error amount of the rotation angle sensor to a zero phase, which is the phase where the torque crosses zero in the voltage phase-torque map, as a secondary upper limit phase smaller than the primary upper limit phase, and calculating a phase obtained by subtracting a maximum offset error amount of the rotation angle sensor from the zero phase as a secondary lower limit phase larger than the primary lower limit phase; and setting a range from the primary lower limit phase to the secondary upper limit phase as a secondary limit range when the command torque is negative, and setting a range from the secondary lower limit phase to the primary upper limit phase as a secondary limit range when the command torque is positive; and operating the torque feedback control unit to limit the pre-limitation voltage phase to the secondary limit range.

4. A tangible computer readable storage medium storing a program configured for execution by at least processor of an AC motor control device, wherein the AC motor control device includes a torque feedback control unit configured to calculate a voltage phase of an output voltage of an inverter, which converts DC power into AC power and supply it to an AC motor, as a manipulated variable for feedback controlling a torque output by the AC motor, and a switching command generation unit configured to generate a switching command for driving the inverter based on the voltage phase and a voltage amplitude calculated by the torque feedback control unit, and the torque feedback control unit includes a function of calculating an estimated torque based on an electrical angle detected by a rotation angle sensor, a function of calculating a pre-limitation voltage phase so as to bring a torque deviation between a command torque and the estimated torque close to 0, a function of setting a voltage phase limit range in a voltage phase-torque map defined according to a system voltage that is a DC voltage input to the inverter and a rotation speed of the AC motor, and a function of limiting the pre-limitation voltage phase to a voltage phase limit range, the program including instructions when executed by the at least one processor to carry out:

setting a primary limit range from a primary lower limit phase to a primary upper limit phase within an interval from a minimum torque phase to a maximum torque phase in the voltage phase-torque map;

calculating a phase obtained by adding a maximum offset error of the rotation angle sensor to a command phase, which is a phase corresponding to the command torque in the voltage phase-torque map, as a secondary upper limit phase, and calculating a phase obtained by subtracting a maximum amount of offset error of the rotation angle sensor from the command phase as a secondary lower limit phase;

setting a range from a larger phase of the primary lower limit phase or the secondary lower limit phase to a smaller phase of the primary upper limit phase or the secondary upper limit phase as a secondary limit range; and operating the torque feedback control unit to limit the pre-limitation voltage phase to the secondary limit range.

* * * * *